May 28, 1957 — E. J. RIVOCHE — 2,793,598
APPARATUS FOR FORMING DOUGH
Filed Feb. 18, 1953 — 2 Sheets-Sheet 1
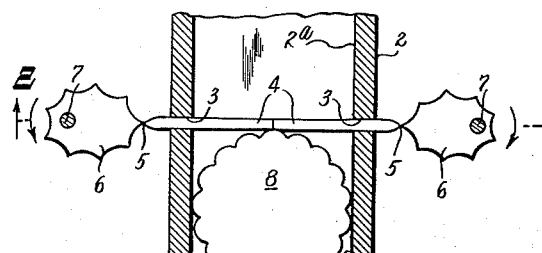
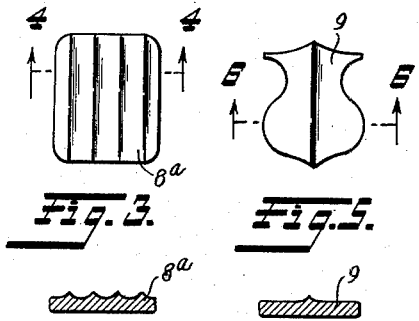
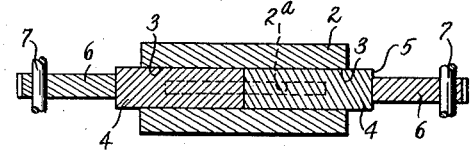
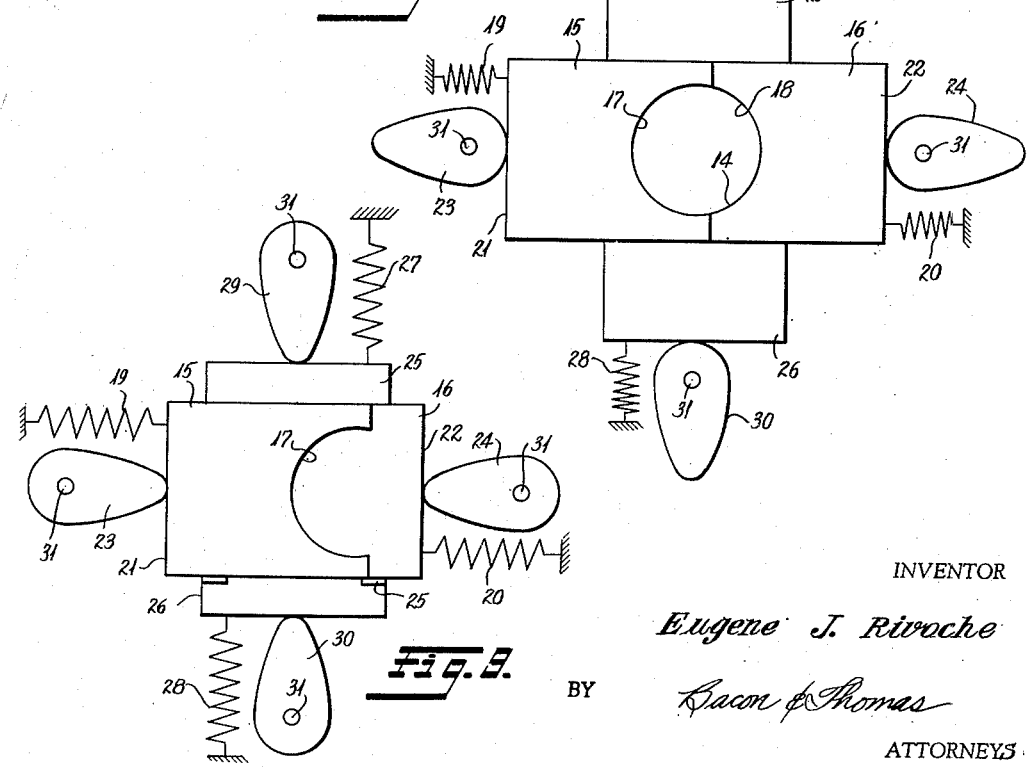
INVENTOR
Eugene J. Rivoche
BY Bacon & Thomas
ATTORNEYS

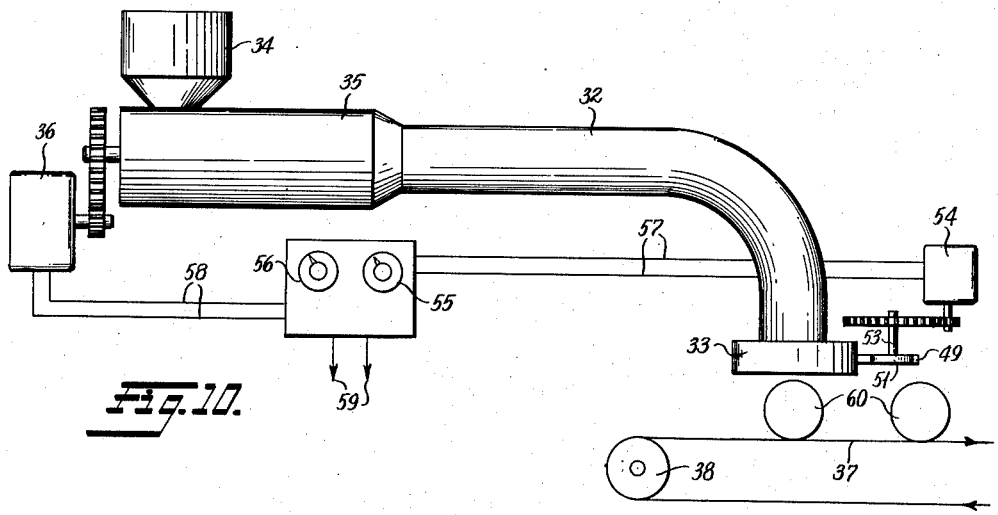
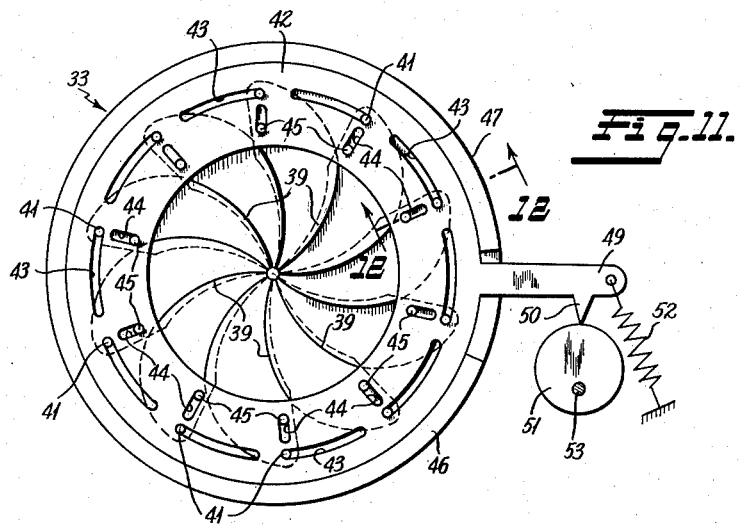
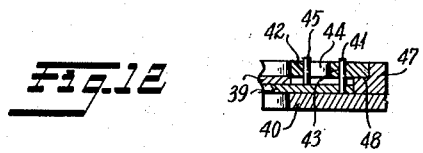

United States Patent Office 2,793,598
Patented May 28, 1957

2,793,598

APPARATUS FOR FORMING DOUGH

Eugene Joel Rivoche, Washington, D. C.

Application February 18, 1953, Serial No. 337,511

5 Claims. (Cl. 107—14)

This invention relates to apparatus for forming baked and cooked products and, more particularly, relates to a new means for extruding and forming dough products.

Heretofore it has been the practice in the baking industry to form cookies and similar articles into the desired shapes by means of suitable dies which might either be single or plural in number and which might be either manual or automatic in operation. This method of forming cookies has many disadvantages, the most serious of which is the fact that there is much material left unused on the outside of a plurality of dies when the dies are simultaneously pressed into a layer of dough. Where this dough is re-kneaded and fed back to the fresh batch of dough, there is entailed extra labor and machinery which renders the process costly and uneconomical. Where such wastage is avoided through the use of relatively complex drum type die machinery, the initial and operating cost is excessively high. A further disadvantage of the die method is the fact that it is incapable of producing in a single step a three-dimensionally curved cookie, that is, a cookie having a doubly tapering cross section in two perpendicular planes, such as a double-ended conoid, an ellipsoid, a spherioid, or any re-entrant shape. The conventional procedure for producing such cookies has been to utilize a pair of dies, one die of the pair producing one-half of the cookie and the other die producing the other half of the cookie, the two cookie halves being subsequently joined in an additional operation.

It is an object of the present invention to produce cookies in a continuous process in which any desired three-dimensional shape may be imparted to the cookies and wherein but one single forming step is employed.

It is another object of this invention to provide for the continuous forming of cookies in any desired shape by means of apparatus which is simple in nature, foolproof in operation, and economical.

It is a further object of this invention to produce apparatus which will carry out the foregoing process.

According to this invention, cookie or any desired type of dough is fed continuously under pressure through a feed pipe which terminates in an output end. At the output end of such feed pipe there is provided a diaphragm device having a continuously adjustable aperture which forms a closure means for the pipe. The diaphragm device is athwart the feed pipe so that all dough fed through the feed pipe must be extruded through the diaphragm aperture and thus have its cross section determined by the position of the aperture forming elements. By varying the size and shape of such aperture as dough is fed through the feed pipe, it is possible to form cookies having any desired shape. The aperture forms an integral part of the feed pipe, and by closing also serves the function of cutting the dough to determine the length of the cookies. Conversely, the aperture may remain open but may vary the size of its opening in correlation with the speed of feed of the dough so that an endless elongated product is extruded with continuous shaping of its cross section.

Referring to the figures of the drawings:

Figure 1 is a plan view of one embodiment of the invention;

Figure 2 is a vertical section taken on the line 2—2 of Figure 1;

Figure 3 is a plan view of a cookie made according to the invention;

Figure 4 is a cross sectional view of the cookie of Figure 3 taken on the line 4—4;

Figure 5 is a plan view of another cookie made according to another embodiment of the invention;

Figure 6 is a cross sectional view of the cookie shown in Figure 5 taken on the line 6—6;

Figure 7 is a cross sectional view of a cookie made according to a further embodiment of the invention;

Figure 8 is an end view of a second embodiment of the invention;

Figure 9 is an end view of the embodiment of Figure 8 with the knives closed;

Figure 10 is a diagrammatic view of a third embodiment of the invention;

Figure 11 is a detailed plan view of the diaphragm device of Figure 10; and

Figure 12 is a fragmentary sectional view substantially on line 12—12 of Figure 11.

Referring to Figures 1 and 2 of the drawings, there is shown an output end 1 of a feed pipe 2 which is preferably rectangular in cross section having a feedway 2a. Adjacent the end of feed pipe 2 and in the side walls thereof are passageways 3 in which are mounted slidable knives 4. The knives 4 have rounded outer ends 5 and are spring-loaded or otherwise biased in a direction away from the center of feed pipe 2 by any conventional means, not shown. The rounded ends 5 of knives 4 serve as cam followers and are urged by the biasing means into engagement with a pair of cams 6 rotating on shafts 7. The cams 6 are of a generally elliptical shape but have fluted edges and are mounted eccentrically on the shafts 7. It will thus be seen that rotation of the cams 6 and subsequent movement of the ends 5 of knives 4 along the fluted outer edges thereof will effect scalloped edges on dough passing between the inner ends of said knives. The shafts 7 are driven by any suitable power source such as a variable speed electrical motor and suitable speed reduction gearing with the speed control of the motors being correlated with the speed of feed of the dough through pipe 2. This correlation might be easily accomplished as, for instance, by forcing the dough through the feed pipe by means of a motor-driven screw or worm type feeder which has its motor speed interconnected with the speed controller for the motors driving the cams 6. When the speed of dough feed is properly related to the speed of rotation of cams 6, it will be apparent that the reciprocatory motion of knives 4 will form flutes or scallops on the cookie as is shown on the cookie 8 in Figure 1. It will also be obvious that by varying the relationship between the speed of dough feed and the speed of rotation of the cams, a wide variety of cookie cross sections can be obtained. By replacing cams 6 with cams of varying shapes, it is possible to further vary the cookie shape and the combination of speed correlation and cam shape variation can be utilized to form a cookie of any desired shape.

In addition to determining the cross section shape of the cookies, the knives 4 also serve as a feed pipe closure or as a cookie cutter, since closure of the knives so that their ends contact closes the output end of the feed pipe and prevents the further escape of dough. It should be noted that the knives 4 are always in contact with the dough, and even when stationary, are forming the product extruded therethrough.

By varying the shape of the feedway 2a of the feed pipe 2, it is further possible to obtain a variety of designs in the cross sectional shape of the cookie transverse to the longitudinal axis of the feed pipe. Thus, in Figures 3 and 4, there is shown a cookie 8a which is formed with a feedway, the upper wall of which has a scalloped inner surface. In Figures 5 and 6, there is shown a cookie 9 which is formed with a different set of cams and with a feedway, the upper wall of which is provided with a singular upwardly extending flute. The shape of the ends of knives 4 may also be varied to produce cookies having edges of any desired cross section. For instance, there is shown in Figure 7 the cross section of a cookie 13 which may be formed through the use of knives having fluted ends.

In Figures 8 and 9, there is shown a further embodiment of the invention wherein the cross section of the feed pipe is varied on two perpendicular axes simultaneously. Thus, a circular feed pipe 14 has mounted at its exit a pair of knives 15 and 16 having semi-circular concavities 17 and 18 in their inner edges. These knives 15 and 16 are mounted to be slidable in a direction perpendicular to the longitudinal axis of the pipe and are biased by any suitable means such as by springs 19 and 20 in a direction away from the center of the pipe causing their outer ends 21 and 22 to abut cams 23 and 24. Similarly located perpendicular to the longitudinal axis of the pipe 14 and perpendicular to the axis of movement of knives 15 and 16 is a further pair of similarly shaped knives 25 and 26, which are spring-loaded by means of springs 27 and 28 into engagement with cams 29 and 30. All of the cams 23, 24, 29 and 30 are keyed to respective shafts 31 which are driven by an suitable variable speed drive, not shown. By rotating the cams 23, 24, 29 and 30 it is possible to vary the size and shape of the orifice at the exit end of the feed pipe from a fully opened circular position as shown in Figure 8 to a fully closed position as shown in Figure 9, and by regulating the rate of rotation of cams 23, 24, 29 and 30 with respect to the rate of feed of the dough-like material through the feed pipe, it is possible to produce cookie-like products of widely varying shapes. Still further variation in the shape of the product may be obtained through a replacement of the cams 23, 24, 29 and 30 with cams of a different shape. With this and the foregoing embodiments of the invention, it is possible to continuously vary not only the aperture size, but also its shape so that highly fanciful cookies may be produced.

In Figures 10 and 11, there is shown still another embodiment of the invention wherein a feed pipe 32 has mounted at its output end an orifice or diaphragm device 33 which is capable of presenting a circular orifice of varying diameter. As is true in the case of each of the foregoing embodiments, the feed pipe 32 is fed with a dough- like material which enters hopper 34 and is thence fed by means of any conventional feeder mechanism, such as screw type feeder 35 driven by variable speed motor 36, into the pipe 32. Directly beneath the diaphragm means 33 is located a conveyor assembly including a belt 37 and driving drum 38 to carry the product to storage or to a cooking device.

While many types of adjustable diaphragm devices might be used to obtain a circular orifice of variable diameter, a particular type is illustrated in Figure 11 for clarity of description. In this particular orifice means, a plurality of overlapping knives 39 are simultaneously movable to vary the size of the diaphragm opening. The knives 39 preferably have a configuration approximating that of a semi-crescent. As shown, the diaphragm comprises a base plate 40 having a series of circularly arranged pins 41 secured therein. Disposed parallel to the base plate and supported a short distance therefrom so as to provide a space for the diaphragm knives 39 is an annular plate 42 having a series of elongated curved slots 43 in which the pins 41 are respectively adapted to project, the plate being guided in angular movement thereby. Also arranged in said plate 42 is a series of radially disposed slots 44 corresponding in number to the diaphragm knives 39 and being evenly spaced about the plate. Each diaphragm knife 39 is pivotally supported near one end on one of the pins 41 and carries intermediate its ends a short pin 45 which extends into one of the slots 44. The plate 42 may be held in spaced relation with the base plate by integral curved projecting guides 46 and 47 on the base plate which engage the edges of the latter, the guides having shoulders 48 extending under the edges of the plate 42 so as to give the plate the required spacing. It will thus be seen that any movement of plate 42 relative to the base plate will cause the diaphragm knives 39 to move to open or close the diaphragm opening. At one side of the plate 42 there is provided a lever 49 having a cam follower 50 urged against a cam 51 by any suitable means such as a spring 52. The cam 51 is keyed to a shaft 53 which is driven by any suitable variable speed drive, such as motor 54. Rotation of the cam 51 will cause oscillation of the plate 42 and will thereby cause a recurrent opening and closing of the diaphragm opening.

The speed of motor 54 which controls the size of the diaphragm opening is controlled by a controller 55 while the speed of the motor 36 is controlled by a controller 56, the motors being connected to the controllers by means of leads 57 and 58, respectively. The controller receives power through leads 59. With a proper adjustment of the speeds of motors 36 and 54, it is possible to produce spherically shaped products such as 60 or with a variation in the speeds of one or the other of the motors and/or with a variation in the shape of the cam 51, it is possible to produce an endless variety of shapes such as ellipsoids, conoids, etc.

Whereas there have been disclosed specific embodiments of my invention for producing specific cross sectional shapes, it is to be understood that the invention is not limited to the specific embodiments shown by way of illustration, it being possible, for instance, to produce innumerable other cross sections of variable size, such as stars, hearts, triangles, rectangles, or other suitable figures, a suitable adjustable diaphragm device which might be adapted to this purpose being disclosed, for instance, in U. S. Patent No. 1,288,555. The specific embodiments shown are intended as a means of illustration only and the invention is to be deemed limited only by the letter and spirit of the appended claims.

I claim:

1. In a device for forming dough-like masses: an extrusion die means having a plurality of moveable members, each of said members having a forming edge, said forming edges being arranged continuously in a series in a circumscribing manner to define an extrusion opening; cam means for cyclically moving said members to vary all dimensions of said opening which extend radially outward from the geometric center of said opening, whereby the size of said opening may be altered; means for forcing dough through said opening; and means for actuating said cam means to vary the dimensions of said opening while dough is moving therethrough.

2. The device of claim 1 wherein said moveable members include at least two overlapping forming blades.

3. The device of claim 1 wherein at least two of said moveable members are adapted to move in mutually transverse directions.

4. The device of claim 1 wherein said plurality of moveable members are arranged to form an iris diaphragm to thereby define a generally circular opening having a variable diameter.

5. In a device for forming dough into individual masses: an extrusion die member having a base plate with a relatively large central aperture formed therethrough, a plurality of overlapping blade elements pivotally mounted with respect to said base plate at evenly spaced points about the outer portions thereof, said blade elements extending inwardly across said aperture toward the center thereof to substantially close said aperture, actuating means to pivot said blade elements simultaneously in a plane parallel to said plate whereby intersecting edge portions of said blade elements cooperate in a circumscribing manner to define an extrusion opening; means for feeding said dough to said die member; and cam means for operating said actuating means to move said blade elements cyclically between closed and open position in timed relation to the feeding of said dough whereby the size of the aperture is varied as said dough passes therethrough to form said dough into a series of individual shaped masses.

References Cited in the file of this patent

UNITED STATES PATENTS

| | | | |
|---|---|---|---|
| 209,963 | Ducsh | Nov. 19, | 1878 |
| 269,535 | Owens | Dec. 26, | 1882 |
| 429,803 | Abrell | June 10, | 1890 |
| 554,273 | Hueg | Feb. 11, | 1896 |
| 573,432 | Negson | Dec. 15, | 1896 |
| 738,242 | Romero et al. | Sept. 8, | 1903 |
| 1,724,563 | Cooper | Aug. 13, | 1929 |
| 1,933,557 | Kalvin | Nov. 7, | 1933 |
| 2,234,432 | Gallo | Mar. 11, | 1941 |

FOREIGN PATENTS

| | | | |
|---|---|---|---|
| 272,176 | Germany | Mar. 26, | 1914 |